Figure 1:
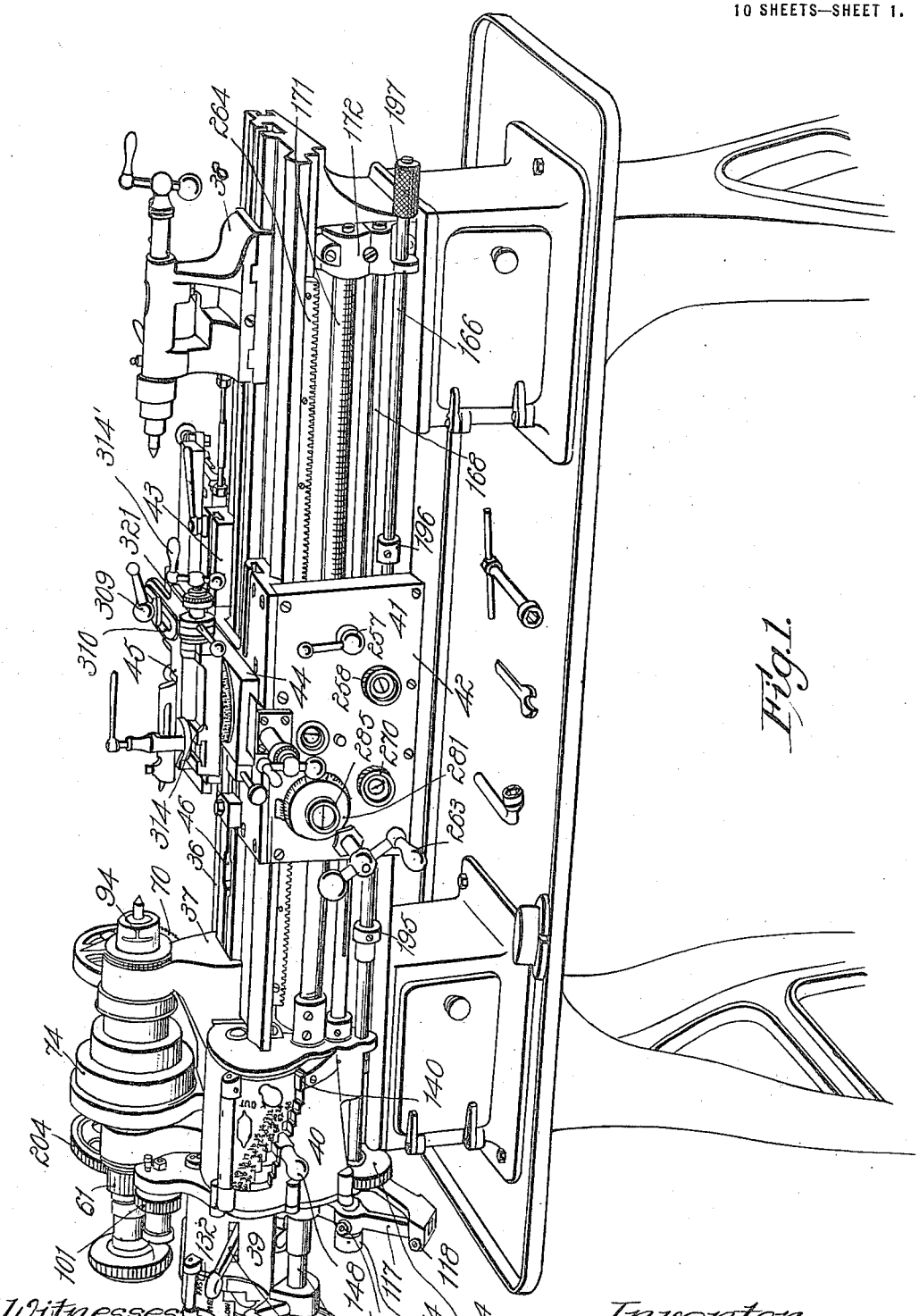

F. HARDINGE.
QUICK CHANGE SWING PRECISION LATHE.
APPLICATION FILED JAN. 28, 1915.

1,280,215.

Patented Oct. 1, 1918.
10 SHEETS—SHEET 5.

Witnesses:
Robert F. Brack
Albin C. Ahlberg

Inventor
Franklin Hardinge
By
Attorney

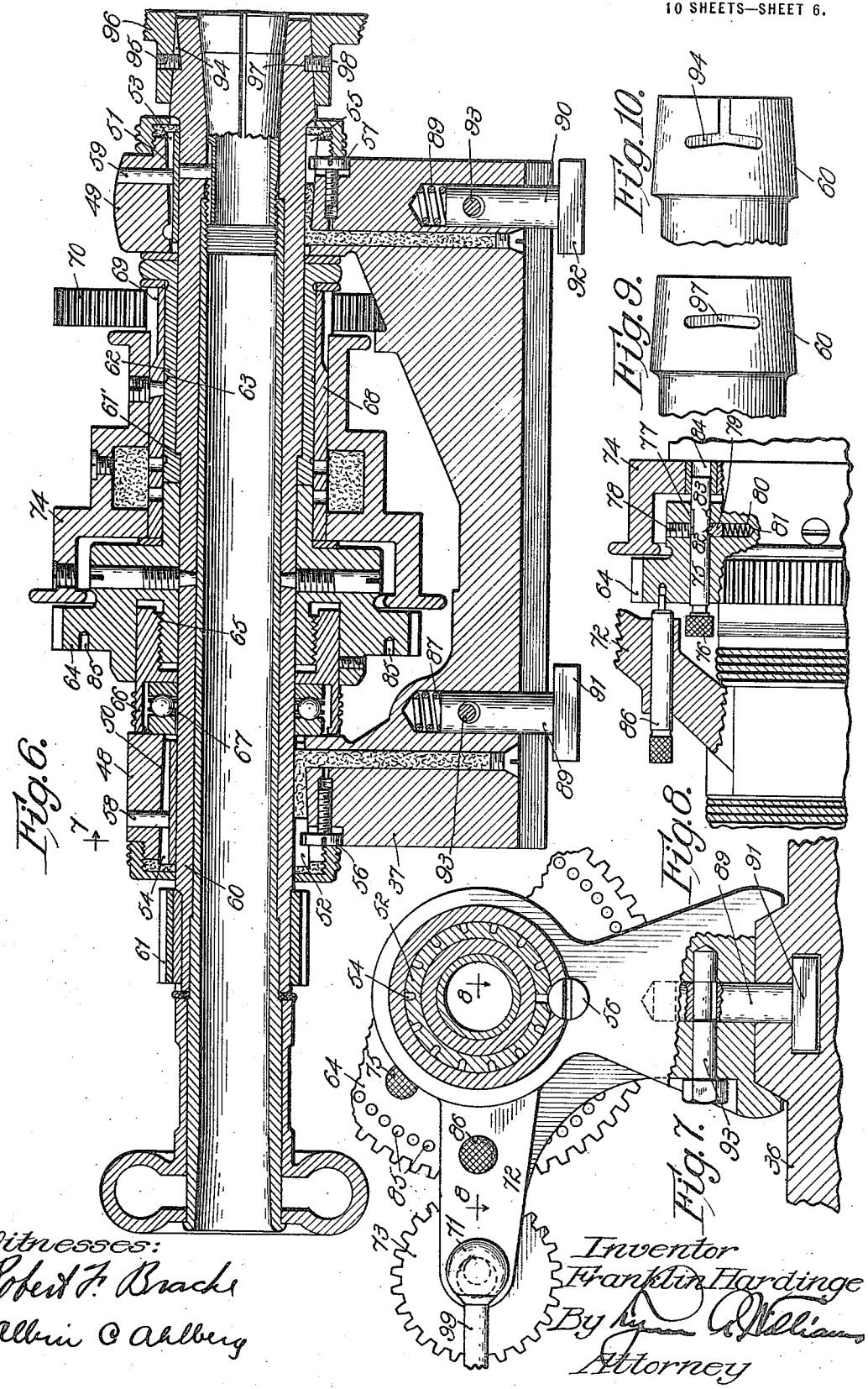

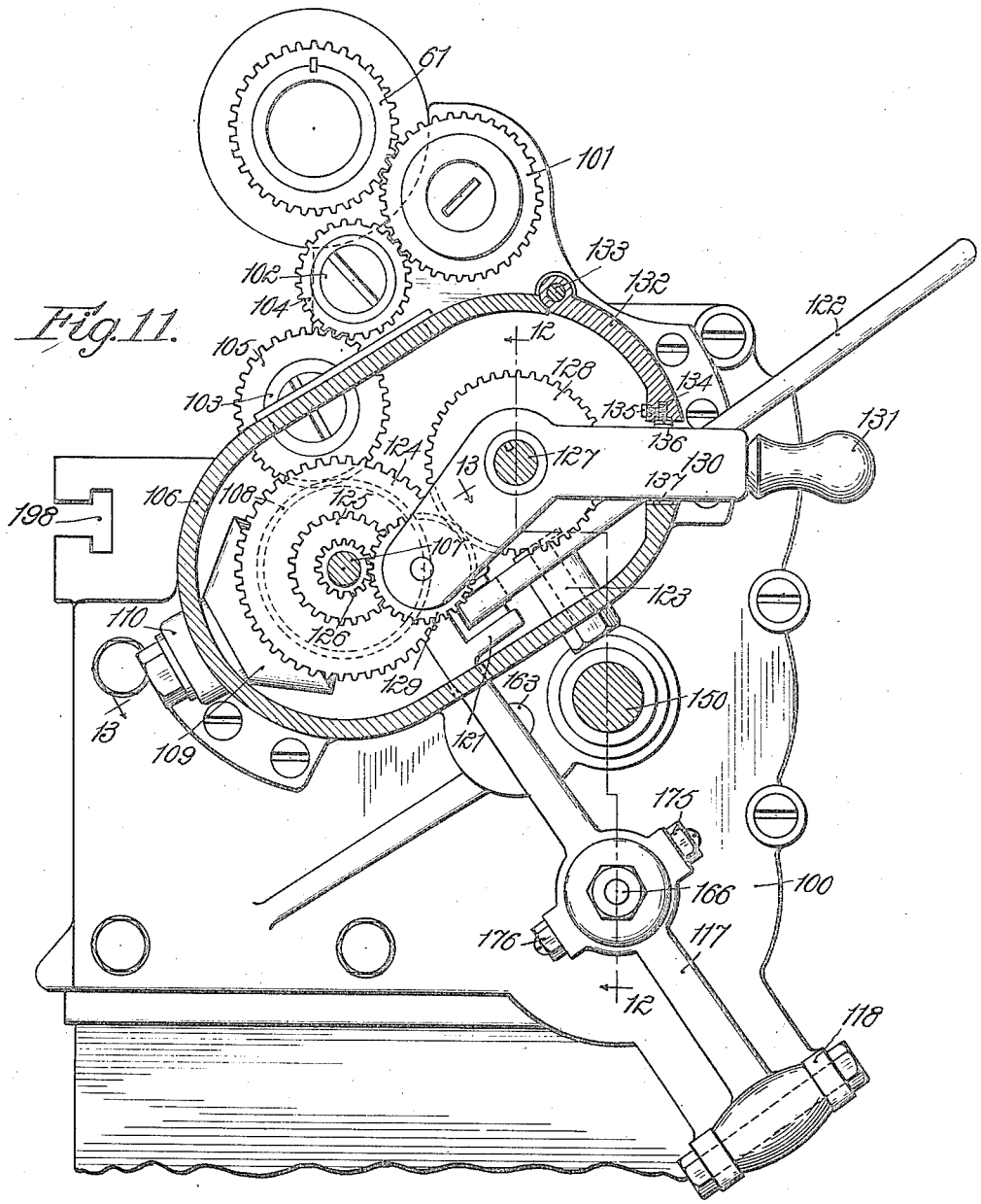

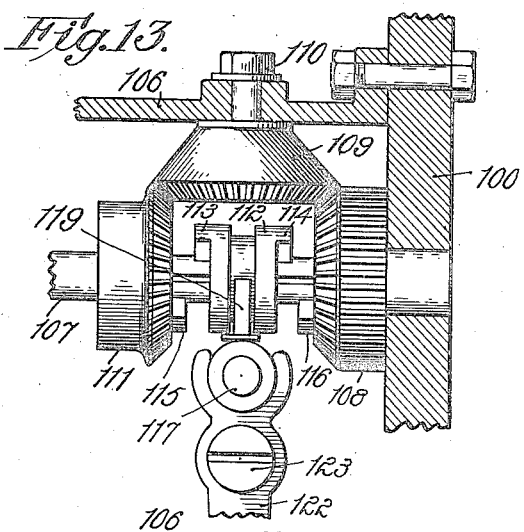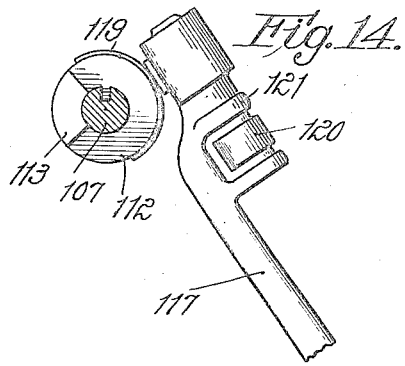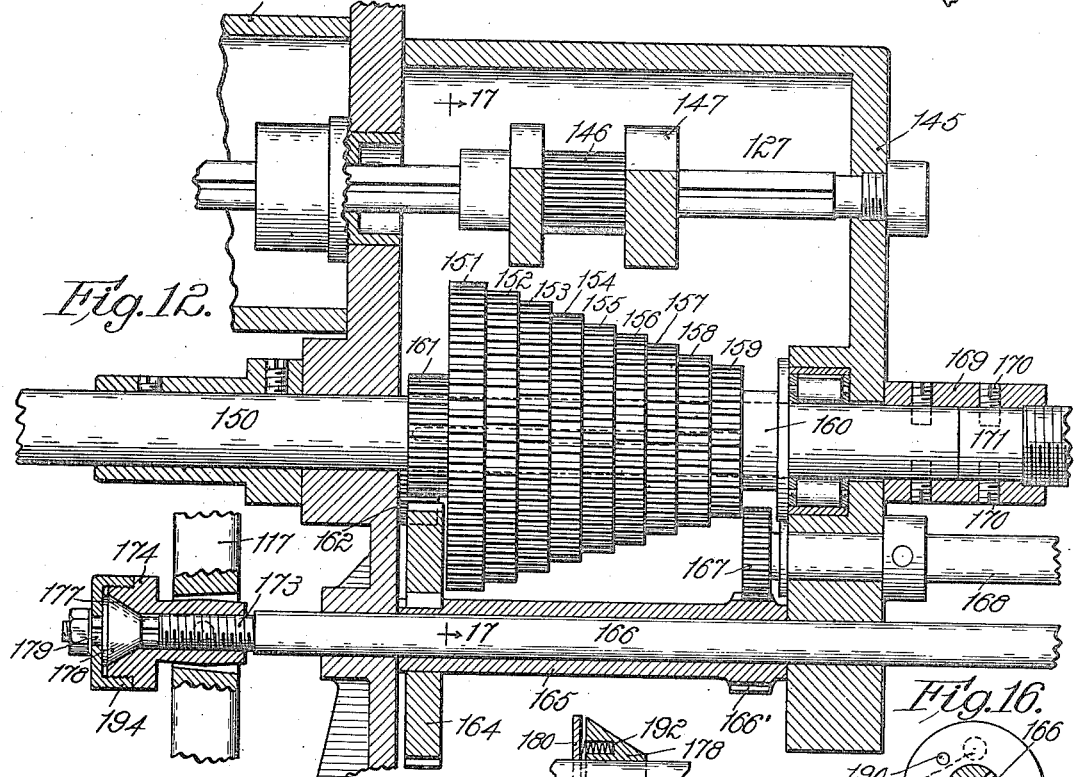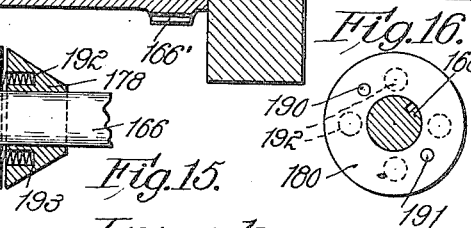

F. HARDINGE.
QUICK CHANGE SWING PRECISION LATHE.
APPLICATION FILED JAN. 28, 1915.

1,280,215.

Patented Oct. 1, 1918.
10 SHEETS—SHEET 9.

Witnesses

Inventor
Franklin Hardinge
By
Attorney

F. HARDINGE.
QUICK CHANGE SWING PRECISION LATHE.
APPLICATION FILED JAN. 28, 1915.
1,280,215.
Patented Oct. 1, 1918.
10 SHEETS—SHEET 10.
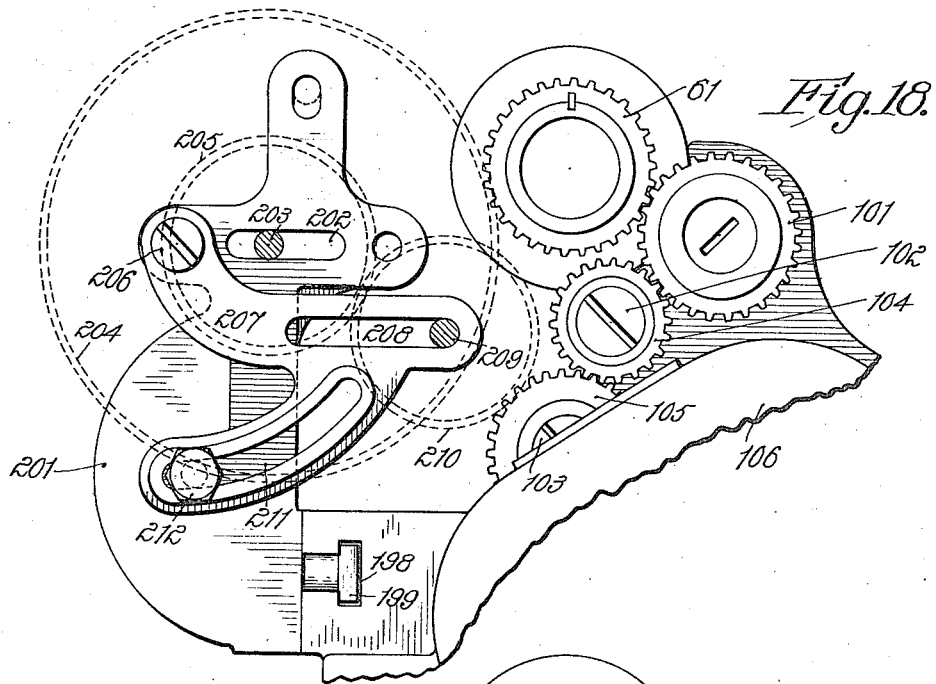
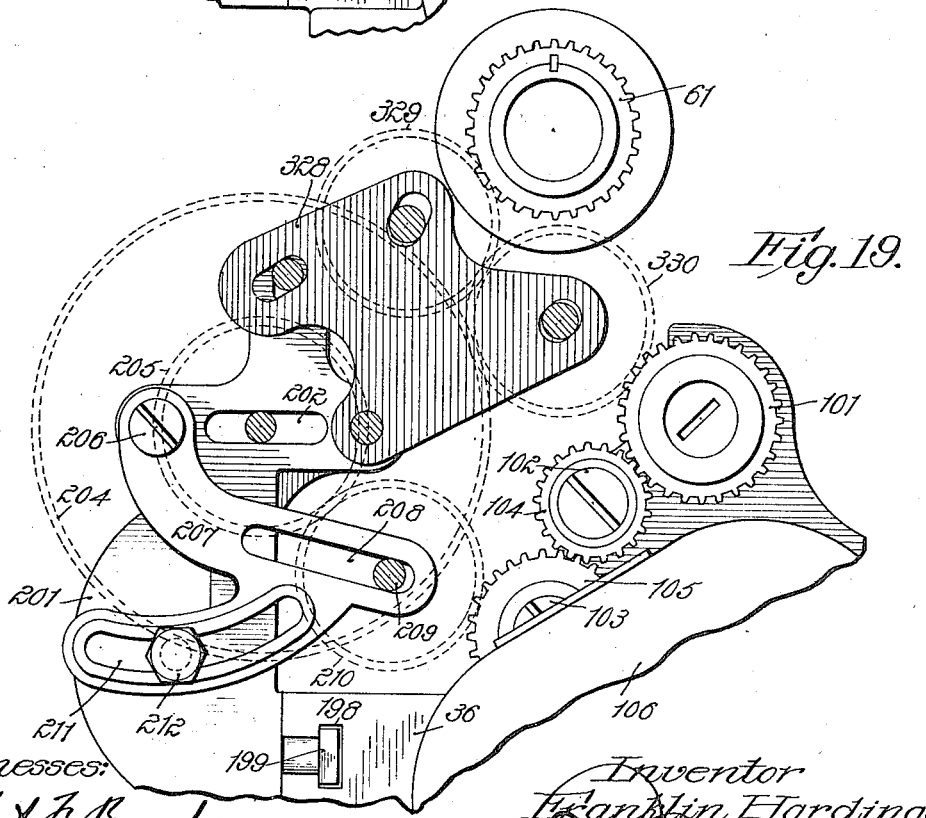

UNITED STATES PATENT OFFICE.

FRANKLIN HARDINGE, OF CHICAGO, ILLINOIS, ASSIGNOR TO HARDINGE BROTHERS, OF CHICAGO, ILLINOIS, A CORPORATION OF ILLINOIS.

QUICK-CHANGE-SWING PRECISION-LATHE.

1,280,215.        Specification of Letters Patent.        Patented Oct. 1, 1918.

Application filed January 28, 1915. Serial No. 4,841.

*To all whom it may concern:*

Be it known that I, FRANKLIN HARDINGE, a citizen of the United States, residing at Chicago, in the county of Cook and State of Illinois, have invented a certain new and useful Improvement in Quick-Change-Swing Precision-Lathes, of which the following is a full, clear, concise, and exact description, reference being had to the accompanying drawings, forming a part of this specification.

My invention relates to a quick-change-swing precision lathe and has for its object the provision of a lathe of this class, that is, one which can be easily and quickly adjusted for different swings, which still maintains its high degree of accuracy which heretofore has been common only in the stationary or one-swing type of lathe.

In carrying out the objects of my invention I provide a bed somewhat along the lines of the usual lathe bed which is provided on its upper face with a longitudinal slot so as to removably support the head stock. The head stock is provided with novel bearing mechanism whereby the end shake of the cone pulley and the spindle end shake are independent. Secured to the head spindle and at the rear or front end thereof is a single gear or pinion, which is the only means for transferring motion or power from the head to any one of the mechanical devices carried by the bed of the lathe. Carried by the bed and at the head end thereof is a transmission train of gears one of which is adapted to mesh with the pinion mounted on the head spindle.

In adjusting the head stock or raising it for a larger swing the head stock is removed and a raising block secured to the bed whereupon the head may be placed upon the upper surfaces of the raising block. A suitable bracket is then secured to the rear of the bed upon which is mounted a pair of idler gears for connecting the spindle gear with the bed transmission train. A similar raising block is provided under the tail stock.

In order to obtain any gear ratio which cannot be had through the transmission gearing alone I provide a certain improved bracket which I shall refer to hereinafter as the fine feed bracket, upon which may be mounted gears for obtaining the desired ratio. This bracket is made adjustable so that any size gears may be mounted thereon.

Figure 2:
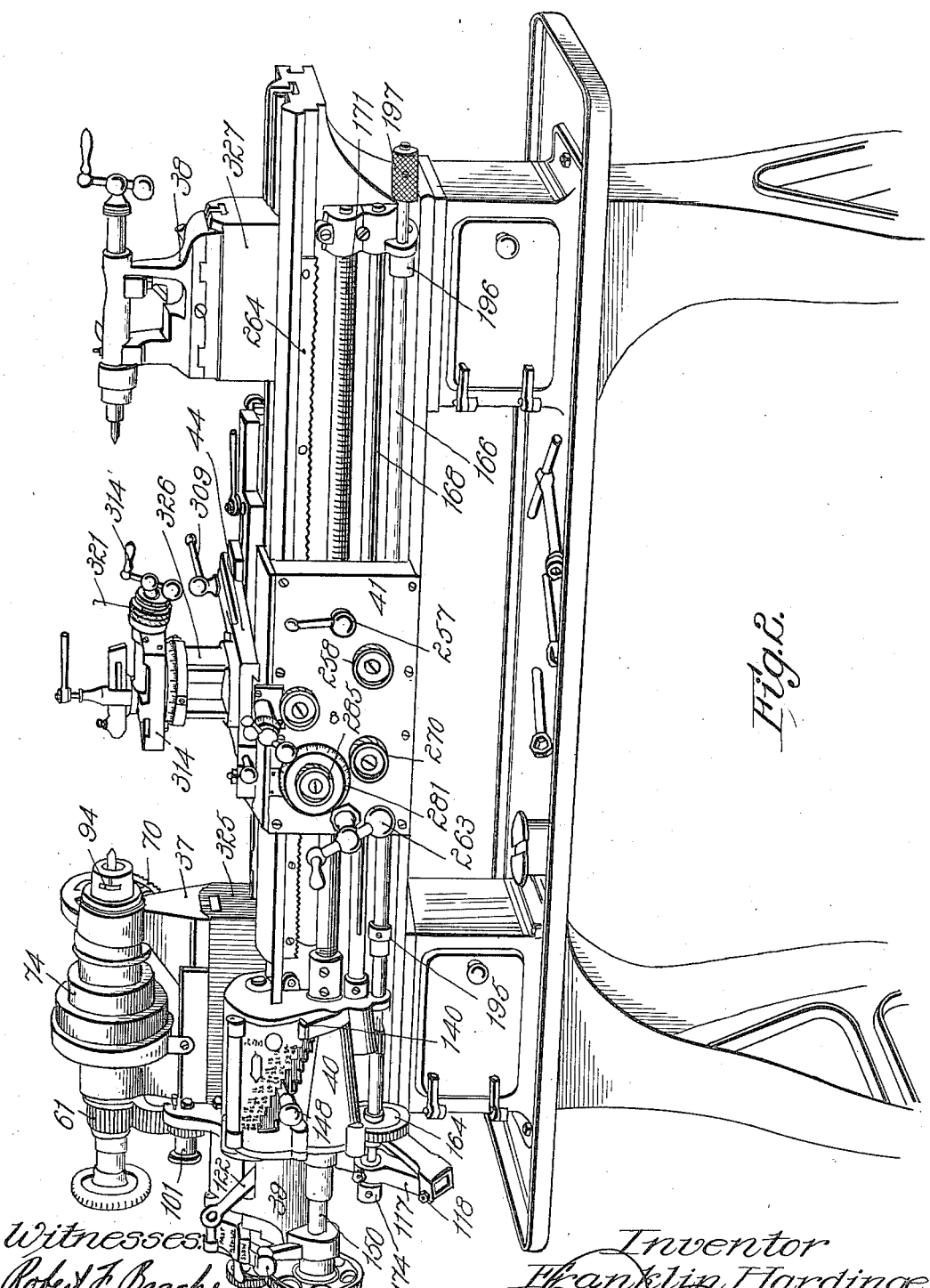
Figure 3:
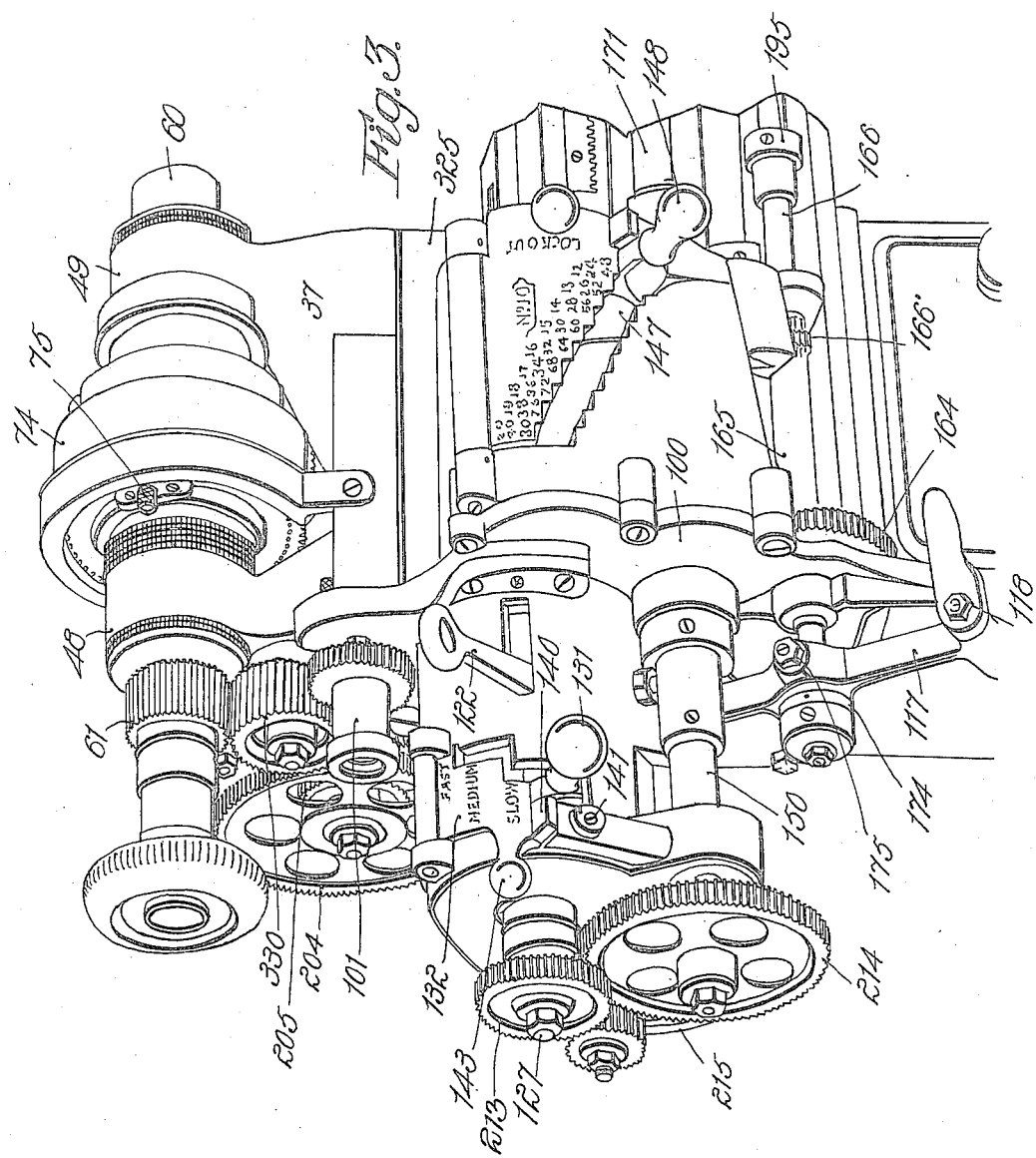
Figure 4:
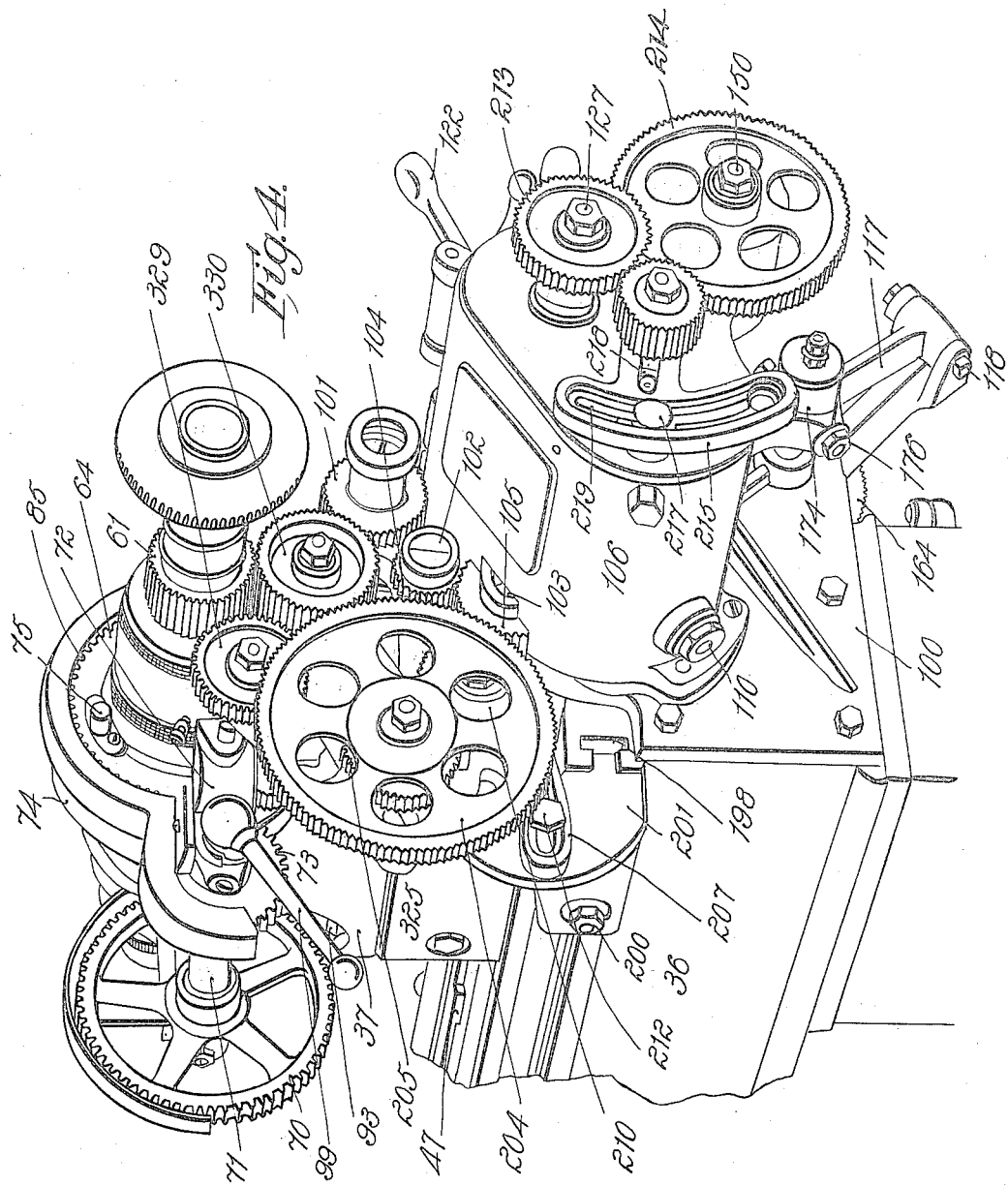
Figure 5:
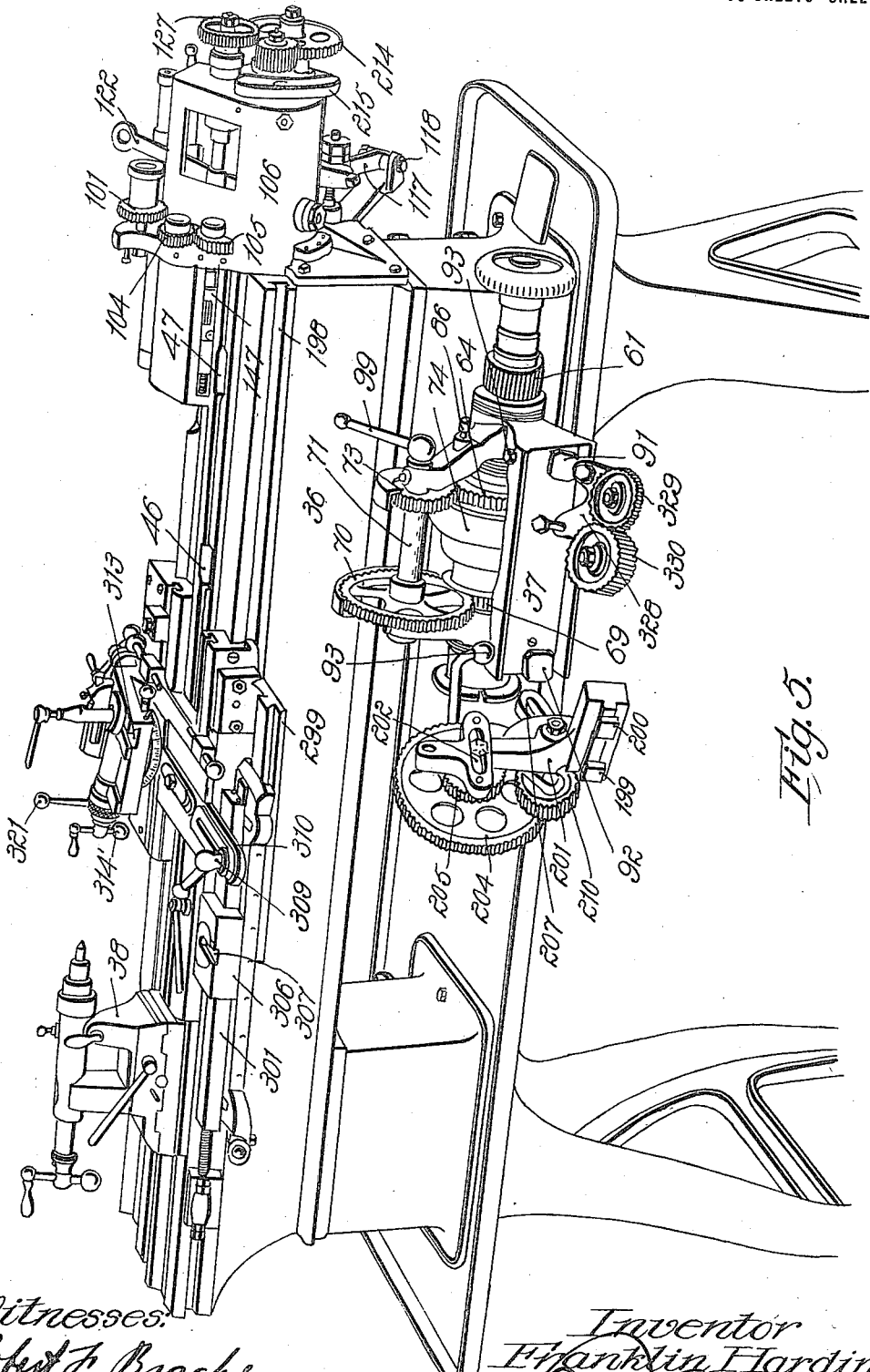
Figure 17:
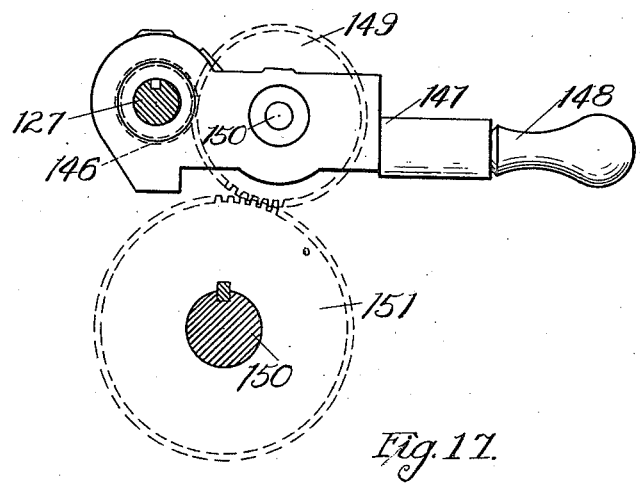
Figure 20:
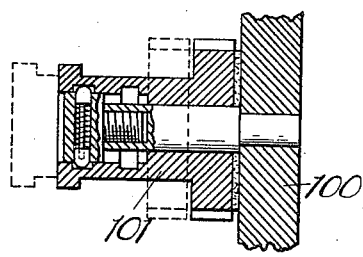

These and other features of my invention will be more fully set forth in the following description wherein reference is made to the accompanying drawings in which, Figure 1 is a perspective view of the lathe of my invention, Fig. 2 is a perspective view showing the head stock, tail stock and compound slide in its raised or large swing position, Fig. 3 is a perspective view of the head end of the lathe showing the fine feed gears and idler gears employed when the head is moved to its raised position, Fig. 4 is a perspective view similar to Fig. 3 taken from the rear of the head end of the lathe, Fig. 5 is a rear perspective view, the head, the fine feed bracket and idler brackets being removed from the bed, Fig. 6 is a longitudinal sectional view of the head, Fig. 7 is a transverse sectional view taken through the line 7 of Fig. 6 looking in the direction indicated by the arrow, Fig. 8 is a fragmentary elevational view of the clutch and index mechanism employed in connection with the head, some of the parts being broken away to more clearly reveal the interior construction, Fig. 9 is a fragmentary end elevational view of the spindle, Fig. 10 is a view similar to Fig. 9, the spindle being turned upon its axis 180 degrees, Fig. 11 is an end view of the bed of the lathe, portions of the gear transmission inclosing casing being broken away to show the construction of the various parts, Fig. 12 is a vertical sectional view of a portion of the transmission mechanism, this view being taken along the line 12, 12 of Fig. 11, and looking in the direction indicated by the arrows, Fig. 13 is a sectional view taken through the line 13, 13 of Fig. 11 and looking in the direction indicated by the arrows, Fig. 14 is a fragmentary elevational view of the automatic stop rod lever and its coöperating clutch member, Fig. 15 is an enlarged sectional detailed view of the friction mechanism employed in connection with the automatic stop rod, Fig. 16 is an end view of Fig. 15, Fig. 17 is a vertical sectional view taken through the line 17, 17 of Fig. 12 looking in the direction indicated by the arrows, Fig. 18 is a fragmentary end view of the pinion mounted upon the head spindle and its coöperating transmission gears, the fine feed bracket being here shown secured in position upon the rear wall of the lathe bed, Fig. 19 is a view similar to Fig. 18 the head being shown in its raised position and an idler bracket mounted upon the fine feed bracket so that transmission is had between the spindle pinion and the gears mounted on the bed of the lathe, Fig. 20 is a longitudinal sectional view of the gear which meshes with the gear mounted upon the head spindle when the head is in its down position and which meshes with one of the idler gears when the head is raised.

Similar reference characters refer to similar parts throughout the several views.

Referring first to Fig. 1 the lathe of my invention comprises a bed 36, a head stock 37, a tail stock 38, gear casing 39, gear casing 40 and a carriage 41. The carriage 41 comprises an apron 42, an apron bridge 43, a cross-feed 44 and an auxiliary cross feed 45. As illustrated the upper surface of the bed is provided with a longitudinal slot in which are arranged two enlarged openings 46 and 47 (Fig. 5).

The head frame 37 supports the journal portions 48 and 49 provided with inwardly tapered bearings 50 and 51. Bushings 52 and 53 are tapered on the outside to correspond with the taper of the bearings 50 and 51 and are provided with longitudinal slots 54 and 55. Set screws 56 and 57 are arranged to engage the bushings 52 and 53 so that the same may be adjusted with respect to the journal portions 48 and 49. Pins 58 and 59 may be provided for maintaining the bushings in the same angular positions. Rotatably mounted within the bushings 52 and 53 is a spindle 60 to which is keyed at the outer end a pinion 61. Mounted over the spindle 60 and arranged to abut against the shoulder 61' is a sleeve 62 which is provided with oil grooves 63. Pinned to the spindle 60 is a clutch gear 64 provided with an outer threaded portion 65 to which is threaded an adjustable knurled member 66. Positioned between the adjustable member 66 and the journal portion 48 is a ball bearing 67. As illustrated the gear 64 is provided with an extension of substantially the same diameter as that of the sleeve 62 over which is slidably mounted a sleeve 68 on which is provided at its inner end a pinion 69 arranged to mesh with a gear 70 mounted upon an eccentric shaft 71 carried by suitable brackets 72 supported from the journal portions 48 and 49. Keyed to the shaft 71 is a second gear 73 which meshes with the gear 64. The cone pulley 74 is pinned to the bearing sleeve 68.

The operation of the mechanism thus far described is as follows:

Power is transmitted to the cone pulley 74, the sleeve 68, pinion 69, gear 70, shaft 71, gear 73, gear 64 and spindle 60.

The clutch gear 64 is provided with a plunger 75 which is provided with a knurled handle 76 and a slot 77 into which is arranged to extend a screw 78 so as to prevent angular movement of the plunger 75. A spring pressed plunger 79 is arranged to reciprocate in a bore 80 in which is mounted a spring 81 and is adapted to engage one of a pair of indentations 82 and 83 carried by the plunger. When the plunger 78 is in its locked position (the position indicated in the drawings) it is adapted to extend into one of a plurality of apertures 84 in the cone pulley. Any number of these apertures 84 may be employed but I have found it desirable to employ but three, each one being placed 120 degrees away from its adjacent one. When it is desired to rotate the spindle at the same rate at which the cone pulley is rotated by the power belt, the gears 70 and 73 are moved to disengage respectively the pinion 69 and gear 64 by the turning of the handle 99 secured to the eccentric shaft 71. The plunger 75 may then be inserted into one of the apertures 84 and a positive connection made between the clutch gear 64 and the cone pulley 74. Provided in the left hand vertical face of the clutch gear 64 is a plurality of apertures 85 each one arranged to receive the small end of a manually operated plunger or index pin 86. I have found it desirable to employ 60 apertures around the face of the gear 64 each one being spaced six degrees from the adjacent aperture, the reason of which will be described hereinafter.

Extending upwardly into circular bores 87 and 88 is a pair of bolts 89 and 90 each carrying at its lower end an engaging head 91 and 92. Extending through an aperture in each of the bolts 89 and 90 is an eccentric rod 93 terminating at its outer end in a hexagonal head so that a tool may be employed for easily rotating the eccentric. In positioning the head upon the bed of the lathe the heads 91 and 92 of the bolts 89 and 90 are inserted in the enlarged openings 46 and 47 (Fig. 5) and the head moved outwardly or toward the end of the bed until the same is in position when the eccentrics 93 may be turned to clamp the heads 91 and 92 of the bolts 89 and 90 against the inner surface of the bed.

The inner end of the spindle 60 as shown in Fig. 10 is grooved at 94 to receive the lower end of a screw 95 carried by a face plate 96. The screw is inserted in the longitudinal portion of the slot 94 and thence into one of the spiral portions, thereby securely locking the face plate against removal from the spindle. It very often occurs in the use of large face plates that the speed at which the face plate is driven will store up energy in the face plate so that when the spindle is stopped the face plate continues its rotation thereby unlocking itself from the spindle. To prevent this unlocking I provide a second slot 97 on the spindle spaced 180 degrees from the slot 94. The slot 97 is similar in all respects to the slot 94 except that the longitudinal portion of the slot is not included. After the face plate is moved to the position indicated in Fig. 6 the second screw 98 is inserted into the slot 97 thereby positively preventing the removal of the face plate 96 until the screw is removed.

Secured to the head end of the bed is a supporting plate 100 upon which is adjustably mounted a pinion 101 (Fig. 11) which is adapted to mesh with the pinion 61 on the head spindle when the head is in its lowermost position. Mounted upon studs 102 and 103 in the plate 100 is a pair of meshing intermediate gears 104 and 105. Positioned longitudinally within the casing 106 carried by the plate 100 is a shaft 107 upon which is loosely mounted a combination spur gear and bevel-gear 108, the spur gear meshing with the gear 105 mounted upon the stud 103. The beveled portion of the gear 108 meshes with a bevel-gear 109 mounted upon a stud 110 carried by the end wall of the casing 106. Loosely mounted upon the shaft 107 is a second bevel-gear 111 which as shown in Fig. 13 meshes with the bevel-gear 109. A clutch member 112 which is keyed to the shaft 107, but is arranged to have longitudinal movement relative thereto, is provided with teeth 113, 114, each adapted when in operating position to engage the tooth 115 of the bevel-gear 111 and the tooth 116 of the gear 108 respectively. Extending downwardly from the shaft 107 is a lever arm 117 pivoted at 118 to the supporting plate 100. This lever 117 is provided with a semi-circular finger piece 119 which partly embraces the clutch member 112. A roller 120 is pivotally mounted in the jaws 121, and coöperates with a manually operated lever 122 pivoted at 123 to the bottom wall of the casing 106. Keyed to the shaft 107 are three gears 124, 125 and 126 having 60, 30 and 15 teeth respectively, for obtaining any gear ratio desired between the spindle and lead screw or feed rod, as will be hereinafter described. Extending parallel to the shaft 107 and slightly above the same is a second shaft 127 to which is keyed a gear 128 meshing with a gear 129 carried at the free end of a bell-crank-lever 130 which terminates at its other end in a handle piece 131. As can readily be seen from Fig. 11 the gear 129 may be caused to mesh with any one of the gears 124, 125, 126 by merely manipulating the lever 130. As shown in Fig. 3 the lever 130 is arranged to fit in any one of three steps with which the casing 106 is provided. A swinging cover 132 pivoted at 133 to the casing 106 serves to maintain the lever 130 into any position to which it may be moved. It is essential that the lever 130 assume a definite position relative to the shaft 127 when the gear 129 is arranged to mesh with any one of the gears 124, 125 and 126. To facilitate quick and easy adjustment of the lever 130 so that proper mesh may be had between the gear 129 and any one of the gears mounted on the shaft 107, I provide an adjustable screw 134 threaded into the lower edge of the swinging cover 132, a set screw 135 coöperating with the screw 134 to maintain it into any position to which it may be moved. The lever 130 may, if desired, be provided with engaging surfaces 136 and 137. If desired the surface of the casing 106 which engages the lower side of the lever 130 may be provided with similar adjusting screws and set screws as illustrated in connection with the swinging cover 132.

The shaft 127 extends inwardly and is supported by bearings carried by the plate 100 and the casing 145. Keyed upon the shaft 127 and movable longitudinally relatively thereto between the plate 100 and the end wall of the casing 145 is a pinion 146 positioned between two arms of an adjusting lever 147 which terminates at its outer end in a handle 148. A gear 149 pivoted at 150 in the bifurcated portion of the lever 147 is arranged to mesh with the pinion 146. Extending parallel to the shaft 127 and positioned slightly below the same is a lead screw shaft 150 upon which is mounted a stack of gears 151, 152, 153, 154, 155, 156, 157, 158, and 159, the gear 149 carried by the adjusting lever 147 being arranged to mesh with either one of the gears in the stack. It will be apparent, therefore, that the lead screw shaft may, by virtue of the gears 124, 125, 126, and the stack of gears 151 to 159 inclusive, be caused to rotate at any one of twenty-seven speeds relative to the head spindle. A bushing 160 is carried at the end of the gear stack so that the gear 149 may assume a position in which it meshes with none of the gears of the stack, when this is desired. Keyed to the shaft 150 is a comparatively small gear 161 meshing with an idler gear 162 mounted upon a stud 163 in the plate 100, which in turn meshes with a gear 164 keyed to a sleeve 165 slidably mounted upon an automatic stop rod 166. The sleeve 165 is toothed at 166 where it is arranged to mesh with a gear 167 keyed to the feed rod 168. On account of the mechanism in the lathe apron it is desirable to bring the feed rod and lead screw in relatively close proximity to each other and since a certain gear ratio must be had between the lead screw and the feed rod, complicated gear transmitting mechanism has been used in the prior art. By means of the back gear arrangement to the feed rod which I employ I am enabled to maintain the feed rod and lead screw in the positions desired, and also the desired ratio between the same without numerous and complicated parts and with a minimum amount of space. The inner end of the shaft 150 has screwed thereto a collar 169 which carries a plurality of screws 170 extending into registering apertures in the lead screw 171. The lead screw 171 is supported at the tail end of the lathe in a split bracket bearing 172 which is bolted to the bed. By means of this construction the lead screw may be removed and another one substituted if this is desired. It is very often desirable to use the lathe for coarse work or for work in which a high degree of accuracy is not necessary. When this is the case the lead screw which is designed for particular or accurate work may be removed and a cheaper or coarser lead screw substituted, or a lead screw having a different thread may be substituted, the nut carried by the apron, of course, being opened and a new one substituted at the end of the carriage.

The automatic stop rod 166 is journaled in the plate 100 one wall of the casing 145 and the split bearing bracket 172, and terminates at its head end in a threaded portion 173 which has threaded engagement with a sleeve 174 pivoted at 175 and 176 to the clutch lever 117. The aperture through which the sleeve 174 extends is tapered inwardly, as illustrated, so that ample room is had between the sleeve 174 and the walls of the tapered aperture when the lever is swung upon its pivot 118.

The sleeve 174 has a tapered surface 177 coöperating with a cone shaped friction member 178 which is keyed to a reduced portion of the automatic stop rod 166. As illustrated in Figs. 15 and 16 a washer 180 is pinned at 190 and 191 to the friction member 178 so that relative angular movement between said washer and member is prevented. The friction member 178 has four sockets 192 in which are disposed springs 193 tending to separate the friction member and washer. A nut is screwed upon the end of the rod 166 between which and the washer is positioned a cap 194 threaded upon the sleeve 174.

The rear wall of the bed 36 is provided with a T-shaped groove 198 adapted to receive a pair of T-shaped bolts 199 and 200 carried by the fine feed bracket 201. As clearly illustrated in Fig. 18 the fine feed bracket is provided with a slot 202 in which is adjustably fixed a shaft 203 upon which are mounted gears 204 and 205, the said gears being rigidly connected with each other so that they are rotated in unison. Pivoted at 206 to the fine feed bracket is a sector 207 containing a slot 208 for the reception of a shaft 209 upon which is mounted a gear 210, the gear 210 meshing with the gear 205. A slot 211 is provided in the downwardly extending portion of the sector 207, whose walls form arcs with the pivot 206 as their center. A retaining bolt 212 extends through the slot 211 into the fine feed bracket and serves to retain the sector into any position to which it may be moved. When it is desired to transmit the power from the spindle gear to the transmission gearing through the fine feed gearing the sliding gear 101 is moved to disengage the gear 102. Power is then transmitted from the spindle gear 61 to the gear 204, gear 205, gear 210 and one of the transmission gears 105. It will readily be seen that any gears may be substituted on the fine feed bracket so that any desired ratio may be had between the spindle gear and the transmission train. Means whereby the gear 101 may be arranged to slide longitudinally upon its stud so that said gear may be disconnected from the gear 104 is illustrated in Fig. 20. The stud upon which the gear 101 is mounted is provided with two spring pressed plungers adapted to register with one of two annular grooves formed in the handle portion of the gear. By moving the gear 101 outwardly as indicated in dotted lines in Fig. 22, it is caused to disengage the gear 104 thereby discontinuing communication between the spindle gear directly with the transmission gear.

When the lathe is to be adjusted for the large swing lifting blocks 325, 326 and 327 are inserted under the head, the auxiliary cross-feed and the tail stock, respectively. The lifting blocks 325 and 327 are provided with eccentric rods similar to those described in connection with the head stock so that the blocks may be secured upon the lathe bed. The upper surfaces of the blocks 325 and 327 carry T-shaped slots similar to the T-shaped slots carried in the upper surface of the bed, so that the T-bolts carried by the head stock and tail stock may be inserted into them to clamp the same to the blocks. The block 326 is placed upon the cross-feed after the same has been removed from the apron sleeve. This is done by merely sliding the cross-feed toward the back of the lathe to disengage it from the apron bridge. A supporting pin is then inserted from the bottom of the cross-feed and the raising block 326 placed thereon, which in turn is connected with the auxiliary cross-feed.

To connect the spindle gear 61 with the gear 101 when the head is raised I employ an idler bracket 328 which is adjustably mounted as shown in Fig. 19 to the fine feed bracket, the intermediate gears 329 and 330 being adjustably mounted upon the idler bracket. Power is thus transferred from the spindle gear 61 to the gear 329 thence to the gear 330 and thence to the power transmission gear 101. If the fine feed gears are to be used the gear 101 is moved in position to disengage the gear 104 whereupon power is transmitted from the spindle gear 61 to the gear 329, gear 330, gears 204, 205, gear 210 to one of the transmission gears 105.

Having thus described my invention what I claim as new and desire to secure by United States Letters Patent is,

1. A quick-change-swing lathe comprising a bed, a lathe head removably mounted on the bed, a spindle in said head, a gear carried by said spindle, transmission gears carried by the bed at the head end thereof, one of said gears adapted to mesh with said spindle gear, means for elevating said head and means for supporting intermediate gear between said spindle gear and transmission gears when the head is in its elevated or large swing position.

2. A quick-change-swing lathe comprising a bed, a lathe head removably mounted upon the bed, a spindle in said head, a gear carried by said spindle, transmission gears carried by the bed at the head end thereof, one of said gears adapted to mesh with said spindle gear when the head is in its small swing position, means for elevating said head, a fine feed bracket carried by the bed and means for supporting intermediate gears upon said bracket, between said spindle gear and transmission gears when the head is in its elevated position.

3. A quick-change-swing lathe comprising a bed, a lathe head removably mounted on the bed, a spindle in said head, a gear carried by said spindle, transmission gears carried by the bed at the head end thereof, one of said gears adapted to mesh with said spindle gear when the head is in its small swing position, means for elevating said head, a fine feed bracket carried by the bed, and an intermediate gear bracket mounted on the fine feed bracket adapted to support intermediate gears between said spindle gear and transmission gears when the head is in its elevated position.

4. A quick-change-swing lathe comprising a bed, a lathe head removably mounted on the bed, a spindle in said head, a gear carried by said spindle, transmission gears carried by the bed at the head end thereof, one of said gears adapted to mesh with said spindle gear when the head is in its small swing position, means for elevating said head, a fine feed bracket carried by the bed and an intermediate gear bracket adjustably mounted on the fine feed bracket adapted to support intermediate gears between said spindle gear and transmission gears when the head is in its elevated position.

5. A quick-change-swing lathe comprising a bed, a lathe head removably mounted on the bed, a spindle in said head, a gear carried by said spindle, transmission gears carried by the bed at the head end thereof, one of said gears adapted to mesh with said spindle gear when the head is in its small swing position, means for elevating said head, a fine feed bracket mounted on the lathe bed, gears carried by the said bracket, one of said gears meshing with one of the transmission gears, an intermediate gear bracket mounted on the fine feed bracket, intermediate gears carried by said intermediate gear bracket adapted to connect the spindle, one of the gears of the transmission train and one of the gears mounted on the fine feed bracket, and means for disconnecting the transmission gears from the intermediate gears.

6. A quick-change-swing lathe comprising a bed, a lathe head removably mounted on the bed, a spindle in said head, a gear carried by said spindle, transmission gears carried by the bed at the head end thereof, one of said gears adapted to mesh with said spindle gear when the head is in its small swing position, means for elevating said head, a fine feed bracket mounted on the lathe bed, gears carried by said bracket, one of the gears meshing with one of the transmission gears and one meshing with the spindle gear and means for disconnecting the transmission gears from the spindle gear.

7. A lathe comprising a bed provided with a longitudinal T-shaped groove in its rear wall, a fine feed bracket, T-bolts carried by said bracket adapted for engagement with said groove and means for tightening said bolts against the walls of the groove.

8. A quick-change-swing lathe comprising a bed provided with a longitudinal T-shaped groove in its rear wall, a fine feed bracket, T-bolts carried by said bracket adapted for engagement with said groove, means for tightening said bolts against the walls of the groove and an intermediate feed bracket mounted on said fine feed bracket.

9. A quick-change-swing lathe comprising a bed provided with a longitudinal T-shaped groove in its rear wall, a fine feed bracket, T-bolts carried by said bracket adapted for engagement with said groove, means for tightening said bolts against the walls of the groove and an intermediate gear bracket adjustably mounted on said fine feed bracket.

10. A lathe comprising a bed, a lathe head mounted on the bed, a pulley carried by the head, a gear carried by the head and driven from said pulley, transmission gears carried by the bed at the head end thereof, one of said gears adapted to mesh with said pulley driven gear, mechanism for elevating the head, and means for supporting an intermediate gear between the pulley driven gear and the transmission gears when the head is in its elevated position.

11. A quick-change swing lathe comprising a bed, a lathe head removably mounted on the bed, a spindle in said head, a gear carried by said spindle, transmission gears carried by the bed at the head end thereof, one of said gears adapted to mesh with said spindle gear when the head is in its small swing position, means for elevating the head, a bracket carried by the bed, and intermediate gear mechanism mounted on the bracket and meshing with the spindle gear and one of said transmission gears when the head is in its elevated position.

12. A lathe comprising a bed, a lathe head mounted on the bed, a pulley carried by the head, a gear carried by the head and driven from said pulley, transmission gears carried by the bed at the head end thereof, one of said gears adapted to mesh with said pulley driven gear, mechanism for elevating the head, and a removable bracket for supporting an intermediate gear between the pulley driven gear and the transmission gears when the head is in its elevated position.

13. A lathe comprising a bed provided with a T shaped groove in its rear wall, a lathe head mounted on the bed, a pulley carried by the head, a gear carried by the head and driven from said pulley, transmission gears carried by the bed at the head end thereof, one of said gears adapted to mesh with said pulley driven gear, mechanism for elevating the head, and a removable bracket fitting in said T shaped groove for supporting an intermediate gear between the pulley driven gear and the transmission gears when the head is in its elevated position.

14. A lathe comprising a bed, a lathe head removably mounted on the bed, a spindle in said head, a gear carried by said spindle, transmission gears carried by the bed at the head end thereof, one of said gears adapted to mesh with said spindle gear, mechanism for elevating the head, and means for supporting an intermediate gear between the spindle gear and the transmission gears when the head is in its elevated position.

15. A lathe comprising a bed, a lathe head removably mounted on the bed, a spindle in said head, a gear carried by said spindle, transmission gears carried by the bed at the head end thereof, one of said gears adapted to mesh with said spindle gear, mechanism for elevating the head, and a removable bracket for supporting an intermediate gear between the spindle gear and the transmission gears when the head is in its elevated position.

In witness whereof I hereunto subscribe my name this 11th day of January, A. D. 1915.

FRANKLIN HARDINGE.

Witnesses:
ROBERT F. BRACKE,
ALBIN C. AHLBERG.